United States Patent [19]

Nishino et al.

[11] 4,421,533

[45] Dec. 20, 1983

[54] METHOD OF REMOVING OZONE AND COMPOSITION THEREFOR

[75] Inventors: Hiroshi Nishino, Osaka; Masayuki Suzuki, Kyoto, both of Japan

[73] Assignee: Takeda Chemical Industries, Ltd., Osaka, Japan

[21] Appl. No.: 361,488

[22] Filed: Mar. 24, 1982

Related U.S. Application Data

[63] Continuation of Ser. No. 209,707, Apr. 17, 1979, abandoned.

[30] Foreign Application Priority Data

| Mar. 27, 1978 | [JP] | Japan | 53-35820 |
| Apr. 5, 1978 | [JP] | Japan | 53-40580 |
| Apr. 17, 1978 | [JP] | Japan | 53-45712 |

[51] Int. Cl.$^3$ .............................. B01D 53/04
[52] U.S. Cl. ............................ 55/68; 55/74
[58] Field of Search ............ 55/68, 74; 252/425, 252/447, 471, 475, 476; 423/210 S, 219, 581

[56] References Cited

U.S. PATENT DOCUMENTS

| 2,835,343 | 5/1958 | Wolff et al. | 55/74 X |
| 3,049,399 | 8/1962 | Gamson et al. | 423/210 S X |
| 3,269,801 | 8/1966 | Boberg et al. | 423/210 S X |
| 3,494,972 | 2/1970 | Friedli | 252/471 X |
| 3,515,679 | 6/1970 | Gaeth et al. | 252/447 X |
| 3,516,783 | 6/1970 | Blanchard | 423/210 S |
| 3,700,605 | 10/1972 | Dodman et al. | 252/447 X |
| 3,770,658 | 11/1973 | Ozaki et al. | 252/471 X |
| 3,830,753 | 8/1974 | Ichikawa et al. | 252/447 X |
| 3,842,121 | 10/1974 | Ichikawa et al. | 252/447 X |
| 4,163,775 | 8/1979 | Foster et al. | 252/447 X |

FOREIGN PATENT DOCUMENTS

| 1444468 | 11/1970 | Fed. Rep. of Germany | 423/210 S |
| 49-187 | 1/1974 | Japan | 252/471 |
| 49-22390 | 2/1974 | Japan | 423/210 S |
| 49-123187 | 11/1974 | Japan | 423/210 S |
| 53-149164 | 12/1978 | Japan | 423/210 S |
| 328592 | 4/1930 | United Kingdom | 423/210 S |

*Primary Examiner*—Robert H. Spitzer
*Attorney, Agent, or Firm*—Wenderoth, Lind & Ponack

[57] ABSTRACT

Compositions comprising (1) manganese compound and (2) one kind or not less than two kinds out of alkali metal and/or alkaline earth metal compounds being supported on activated carbon. Contacting an ozone-containing gas with the said compositions results in highly effective decomposition and removal of ozone contained in the gas. The capability for removing ozone of the compositions is lasting over a long period of time.

6 Claims, 2 Drawing Figures

METHOD OF REMOVING OZONE AND COMPOSITION THEREFOR

DESCRIPTION

This application is a continuation of application Ser. No. 209,707, filed Apr. 17, 1979 (now abandoned).

TECHNICAL FIELD

The present invention relates to a method for efficiently removing ozone in a gas containing ozone, and compositions therefor.

BACKGROUND ART

Ozone, with its strong oxidizing power, is widely utilized in a great variety of applications, such as purification and sterilization of service water, treatment of waste water from industrial plants, treatment of sewage, denitration of waste gases and removal of different kinds of offensive odors.

Ordinarily, required to be used in the systems in which ozone gets involved, is excessive ozone for allowing the oxidation reaction to proceed completely. As a result, the unreacted ozone is discharged and exhausted.

As is well known, ozone is a substance attributed to air pollution or production of the so-called oxidants, and it badly damages the crops through destruction of chlorophyll, suppression of assimilation, etc., not to mention the adverse effects exerted by it on the human body. For that reason, and with a view to the prevention of the secondary environment pollution, excessive ozone must be removed. When air containing ozone at an increased concentration is fed into an airplane flying in the ozonosphere, there are caused several symptoms such as chest pain, cough and headache developing in crew members and passengers, which are furthermore likely to be accompanied by fatigue and lessened attentiveness, and it may be considered possible that the pilots will be kept from controlling and the safety of aerial navigation will be eventually jeopardized. For this reason it is earnestly desired to develop a highly efficient and economical method for treating waste ozone. So far proposed in the past have been (1) activated-carbon method, (2) thermal decomposition method, (3) absorption method with a chemical solution, etc.

The thermal decomposition method mentioned under (2) is a method comprising thermally decomposing ozone by means of a burner utilizing heavy oil, light oil, etc., and the method consisting of introducing an ozone-containing gas into a decomposition furnace at 300° to 400° C. to decompose ozone. The concentration of ozone in a gas is usually low, and the method has, therefore, the necessity of heating a large volume of air and is not economical.

The absorption method with a chemical solution mentioned under (3) is a method comprising introducing an ozone-containing gas into an aqueous solution of a reducing agent such as ferrous salt, sodium sulfite and sodium thiosulfate or an aqueous solution of alkali such as caustic soda to thereby absorb the ozone. Encountered in this method are problems, such as the troublesome procedures required for refilling to supplement the chemicals and treating waste solutions, a lowering of the absorption capacity due to a change in the composition of the chemical solution followed by absorption of ozone, inability to cope with and respond to the changing concentration of ozone in a gas (poor follow-up capability for fluctuating load of the ozone-containing gas), and treatment of waste solutions.

The activated-carbon method mentioned under (1) is a method comprising introducing an ozone-containing gas into a granular activated carbon layer to decompose the ozone to oxygen on the surfaces of the activated carbon. The method has the advantages for example, of being improved in the follow-up capability for a fluctuating load of the ozone-containing gas and of permitting ozone at a very low concentration to be decomposed at ambient temperature. However, it suffers disadvantages, such as a larger pressure loss in passage of air through the layer of activated carbon and the necessity of refilling to supplement a portion of the activated carbon lost through oxidation.

The decomposition mechanism of activated carbon by ozone, although being complicated, is meanwhile classified roughly into (1) action of ozone adsorption (in a narrow sense), (2) action of ozone decomposition catalysis, and (3) chemical reaction between oxygen molecules resulting from decomposition of ozone and activated carbon (combustion). The treatment of ozone with activated carbon has been conventionally considered to permit the treatment of about 5 g of ozone per 1 g of activated carbon, but the ozone decomposition mechanism with activated carbon can not be accounted for wholly by the stoichiometric relationship of three actions above-mentioned, because these three actions are mutually linked together in a complex way, and can be greatly affected by conditions of contact between activated carbon and ozone.

Our research study, while particularly paying our attention to the chemical phenomena at ambient temperature, led to the finding that at relatively low temperatures such as ambient temperature, the adsorption action of ozone onto activated carbon, most outstandingly, takes part in the ozone decomposition activity and the service life of activated carbon. That is to say, ozone is adsorbed by activated carbon at a fairly large rate in parallel with the catalysis. It is assumed that, when the adsorbed ozone is rapidly decomposed and released, the activated carbon, with its active sites being preserved, does not get deactivated. Yet, it has been found that complexes of $C_mO_n$ (where m/n is 1 to 2) from carbon and oxygen are formed on the surfaces of activated carbon due to the powerful oxidizing property of ozone, and get gradually accumulated on the surfaces of activated carbon without being released, to cover the active sites, thus leading to a decrease in the ozone decomposition activity. Additional research studies, conducted based on such a novel finding, led the inventors to the finding that when one kind or not less than two kinds of alkali metals and/or alkaline earth metals are supported as the second component on the activated carbon supported with manganese compounds, ozone in a gas is very effectively decomposed on the surfaces of the resultant compositions, and the service life of activated carbon is prolonged up to three to four times that of the original one. On the basis of these findings, the present invention has been completed.

DISCLOSURE OF INVENTION

The present invention relates to a method for removing ozone which comprises contacting an ozone-containing gas with activated carbon compositions which are supported with (1) manganese compounds and (2)

one kind or not less than two kinds out of alkali metals and/or alkaline earth metals, and to the compositions thereof.

The activated carbon which is used in the present invention may be any type of those that have been activated by conventional methods using, for example, charcoal, coke, coconut shells, etc. as raw materials. Desirable is the one with its specific surface area of about 500 to 2,000 m²/g. Referring to the shape and form, the activated carbon may be either powdered or granular; particularly preferable is the activated carbon in the crushed form with the use of coconut shells as raw material.

The manganese compounds (1) which are useful in the present invention may be water-soluble manganese compounds or those slightly soluble in water. The water-soluble manganese compounds mean those having a solubility in water of not less than about 1 g per 100 g of water (at ambient temperature) and are exemplified by manganese salts such as chloride, sulfate, nitrate, acetate and thiocyanate; manganates such as potassium manganate, sodium manganate and barium manganate; permanganates such as zinc permanganate, ammonium permanganate, cadmium permanganate, potassium permanganate, calcium permanganate, strontium permanganate, sodium permanganate, barium permanganate, lithium permanganate and rubidium permanganate, and the like.

As the manganese compounds slightly soluble in water are mentioned sulfides such as manganese sulfide and manganese disulfide; phosphates such as manganese phosphate; carbonates such as manganese carbonate, and the like.

As the alkali metal and/or alkaline earth metal compounds (2) which are usable in the present invention are mentioned sulfates such as potassium sulfate, lithium sulfate, sodium sulfate, rubidium sulfate, cesium sulfate, francium sulfate, beryllium sulfate, magnesium sulfate, calcium sulfate, strontium sulfate, barium sulfate and radium sulfate; nitrates such as potassium nitrate, lithium nitrate, sodium nitrate, rubidium nitrate, cesium nitrate, francium nitrate, beryllium nitrate, magnesium nitrate, calcium nitrate, strontium nitrate, barium nitrate, and radium nitrate; phosphates such as potassium phosphate, potassium dihydrogenphosphate, potassium hydrogenphosphate, dipotassium hydrogenphosphate, sodium hydrogenphosphate, disodium hydrogenphosphate, sodium phosphate, sodium dihydrogenphosphate, lithium hydrogenphosphate, lithium phosphate beryllium phosphate, rubidium phosphate, calcium phosphate, calcium hydrogenphosphate, strontium hydrogenphosphate, barium phosphate, barium hydrogenphosphate, magnesium hydrogenphosphate, and magnesium phosphate; hydroxides such as potassium hydroxide, sodium hyroxide, lithium hydroxide, rubidium hydroxide, cesium hydroxide, magnesium hydroxide, calcium hydroxide, strontium hydroxide and barium hydroxide; carbonates such as potassium carbonate, potassium hydrogencarbonate, cesium hydrogencarbonate, sodium hydrogencarbonate, lithium hydrogencarbonate, rubidium hydrogencarbonate, cesium carbonate, sodium carbonate, lithium carbonate, rubidium carbonate, calcium carbonate, magnesium hydrogencarbonate, strontium carbonate, barium carbonate, magnesium carbonate and beryllium carbonate; chlorides such as potassium chloride, cesium chloride, sodium chloride, beryllium chloride, lithium chloride, rubidium chloride, calcium chloride, strontium chloride, barium chloride and magnesium chloride; bromides such as potassium bromide, strontium bromide, cesium bromide, sodium bromide, beryllium bromide, lithium bromide, rubidium bromide, calcium bromide, barium bromide and magnesium bromide; iodides such as potassium iodide, cesium iodide, sodium iodide, beryllium iodide, lithium iodide, rubidium iodide, calcium iodide, strontium iodide, barium iodide and magnesium iodide; acetates such as potassium acetate, calcium acetate, potassium hydrogenacetate, strontium acetate, cesium acetate, sodium acetate, barium acetate, beryllium acetate, lithium acetate and rubidium acetate; oxalates such as potassium oxalate, calcium oxalate, potassium hydrogen oxalate, sodium hydrogen oxalate, barium hydrogen oxalate, lithium hydrogen oxalate, strontium oxalate, cesium oxalate, sodium oxalate, barium oxalate, beryllium oxalate, magnesium oxalate, lithium oxalate and rubidium oxalate; tartrates such as potassium tartrate, calcium tartrate, potassium hydrogen tartrate, calcium hydrogen tartrate, sodium hydrogen tartrate, magnesium hydrogen tartrate, lithium hydrogen tartrate, strontium tartrate, cesium tartrate, sodium tartrate, barium tartrate, magnesium tartrate, lithium tartrate and rubidium tartrate; benzoates such as sodium benzoate, calcium benzoate, potassium benzoate, barium benzoate, magnesium benzoate, and lithium benzoate, and other salts with organic acids. Sulfates are desirable in terms of susceptibility to burning, mechanical properties of the resultant product, etc. Out of these alkali metal and/or alkaline earth metal compounds, one or not less than two kinds may be used.

In the present invention, the manganese compounds (1) and alkali metal and/or alkaline earth metal compounds (2) as having been mentioned above are supported on activated carbon. The specific means of supporting may be any manner which may be exemplified by (1) the means, in case water-soluble manganese compounds and alkali metal and/or alkaline earth metal compounds are employed, comprising dissolving these compounds in water, and impregnating or spraying activated carbon with the resultant solution, and (2) the means, in case manganese compounds slightly soluble in water and alkali metal and/or alkaline earth metal compounds are used, comprising formulating appropriate quantities of these compounds into raw materials for activated carbon in the activated carbon production step.

The activated carbon compositions supported with the above-mentioned compounds may be subjected to the procedure of burning at about 100° to 500° C., preferably about 150° to 250° C., under the stream of inert gas such as nitrogen, carbon dioxide and helium. By means of this procedure, the manganese compounds, which have been supported on the activated carbon, may be partly or wholly converted into active manganese oxide being represented by the molecular formula of $MnO_x$ (where $x = 1.3$ to $2.0$). Or, the activated carbon compositions supported with the compounds may be subjected to the procedure of merely drying under the conditions where such a chemical change does not take place.

The amount of the manganese compounds to be supported is, as converted to Mn, 0.1 to 10 parts by weight against 100 parts by weight of activated carbon, and especially preferable is about 0.5 to 5 parts by weight.

The amount of the alkali metal and/or alkaline earth metal compounds to be supported is in the range of about 0.1 to 10 parts by weight as alkali metal and/or alkaline earth metal elements. Assuming that the amount of the alkali metal and/or alkaline earth metal compounds is designated by M and that of the manganese compounds by Mn, desirable is the amount not exceeding about 10 parts by weight in terms of a sum of Mn and M.

In the above-mentioned procedure, the manganese compounds (1) and the alkali metal and/or alkaline earth metal compounds (2) are to be supported on activated carbon, and still, the resultant activated carbon compositions may contain clay in addition to the activated carbon.

The clay may be any type of clay that constitutes hydrous magnesium silicate minerals and/or aluminum silicate minerals, and is exemplified particularly by clay containing as the main component allophane and as auxiliary components kaolinite, pyrophyllite, sericite, montmorillonite, etc., whereby a weight ratio of allophane against the auxiliary components is at about 0.5 to 5 of allophane/auxiliary components; desirable is clay having preferably the weight ratio of 1 to 3. As the clay composed mainly of allophane is, for example, mentioned the clay available under the popular name of "Kanuma allophane clay". These auxiliary components are formulated mainly for the purpose of increasing mechanical properties of the ozone removing agent; examples of the clay which contains a large amount of kaolinite includes fire stone such as "Kibushi" clay and "Gairome" clay; as the clay which contains pyrophyllite in a large amount are mentioned agalmatolite and pagodite; as the clay which contains sericite in a large amount are mentioned the clay called under the popular name of sericite clay and pottery stones containing quartz, feldspar and the like; as the clay which contains a large amount of montmorillonite are mentioned acid clay, bentonite, etc. These kinds of the clay, when being refined by the elutriation, are desirable, and can be employed, when they are finely crushed to the grain size of about 200 to 300 mesh or below, in lieu of those refined by the elutriation.

A rate to be occupied by the activated carbon in the mixture of activated carbon and clay is determined depending on the service life, mechanical properties, thermal stability, etc. of the resultant product, and is, in practical use, about 5 to 40% by weight as the formulation rate before burning; preferable is especially about 10 to 30% by weight. A rate to be occupied by the clay in the mixture of activated carbon and clay is about 45 to 95% by weight against the mixture before burning; desirable is especially about 50 to 75% by weight.

In mixing activated carbon with clay, an appropriate quantity of water may be added. The quantity of water to be added may be varied depending on the type or kind of clay, its formulation rate, etc., and preferably is about 30 to 80% by weight based on the dry raw material. In case water is added, the raw materials are adequately mixed and the resultant paste-like mixture, after being moulded to some form and shape, e.g. cylindrical and spherical forms, may be preliminarily dried. As a representative of the moulding methods are mentioned a tabletting moulding with increased pressure and an extrusion moulding at low pressure; and, the extrusion moulding at low pressure is preferable, because the agents for removing ozone, when being moulded by the tabletting moulding at high pressure, sometimes happen to suffer peeling-off on the surfaces. The agents having been moulded to a form such as the cylindrical and spherical forms may be crushed to an appropriate size or dimension.

When clay is used, the mouldings are preferably burnt.

Burning is conducted, under an inert gas atmosphere such as nitrogen and carbon dioxide, at a temperature of higher than about 240° C., preferably within the range of about 300° to 750° C. for about 30 minutes to 3 hours. In case the temperature is lower than 240° C., the compositions do not get burnt, and the resultant agents for removing ozone exhibit quite inferior water resistance and mechanical properties, thus tending to lose the mechanical properties by their coming into contact with high humidity gases and to decay or break down in the presence of excessive water.

The agent for removing ozone obtained with the use of clay exhibits increased activity and prolonged service life (utilization rate of activated carbon reaches up to about three times), as compared with those conventionally produced, and, being excellent in the thermal stability, water resistance and mechanical strength, offers the advantages, for example, of permitting a safe and efficient removal of ozone under severe conditions where the load fluctuates widely.

The activated carbon compositions produced in the manner as being described above are contacted with an ozone-containing gas. The content of ozone in the ozone-containing gases may be any magnitude of the concentrations and, disirable in particular is about 0.1 to 10,000 ppm. The contacting temperature as low as possible is preferable and, particularly preferable is about 0° to 100° C. The contacting time is normally 1/10 to 20 seconds and, preferable is especially 1/5 to 10 seconds. In allowing a gas to contact with the activated carbon compositions, such a contact is effected by the well known means such as a contact stirring method based on the fixed bed, moving bed or fluidized bed, slurry-system or batch-system.

When an ozone-containing gas contains ill-smelling components such as hydrogen sulfide, mercaptans, sulfides, disulfides, ketones and amines (as the mercaptans are mentioned alkylmercaptans such as methylmercaptan, ethylmercaptan and propylmercaptan, and arylmercaptans such as phenylmercaptan; as the sulfides are mentioned alkyl sulfides such as methyl sulfide, ethyl sulfide, vinyl sulfide and allyl sulfide, and aryl sulfides such as phenyl sulfide and thioanisole; as the disulfides are mentioned alkyl disulfides such as methyl disulfide and allyl disulfide, and aryl disulfides such as phenyl disulfide; as the amines are mentioned primary aliphatic amines such as methylamine, ethylamine, propylamine, isopropylamine, butylamine and amylamine, secondary aliphatic amines such as dimethylamine, diethylamine, diisopropylamine and dibutylamine, tertiary aliphatic amines such as trimethylamine, triethylamine and tributylamine, aliphatic unsaturated amines such as allylamine, alicyclic amines such as cyclopropylamine and cyclobutylamine, and aromatic amines such as aniline; as the ketones are mentioned aliphatic saturated ketones such as acetone, methyl ethyl ketone and isopropyl methyl ketone, unsaturated ketones such as methyl vinyl ketone, alicyclic ketones such as cyclobutanone, cyclopentanone and cyclohexanone, and aromatic ketones such as acetophenone and propiophenone), these ill-smelling components are removed as well. The concentration of ill-smelling components in a gas may be of any magnitude, and is peferably about 0.1 ppm to 500 ppm, in particular.

When ill-smelling components are contained in an ozone-containing gas, the ozone-containing gas is in the first place contacted with activated carbon with high adsorption capacity and then with the activated carbon compositions having the manganese compounds and alkali metal and/or alkaline earth metal compounds supported, to thereby constitute the especially effective means for removing the ill-smelling components and ozone.

When a gas containing ill-smelling components and ozone is contacted with activated carbon with high adsorption capacity, the temperature is preferably maintained at as low as possible, and in particular preferable is the temperature of about 0° to 60° C. The contacting time is usually in the range of 1/10 to 20 seconds, and preferably within the range of 1/5 to 10 seconds.

To be meant by the term, "activated carbon with high adsorption capacity", is the activated carbon having a poor ozone-decomposition capability and a large physical-adsorption capacity at the same time, along with a specific surface area as large as about 1,200 to 2,000 m$^2$/g, and desirable is the activated carbon being employed for gas adsorption. In particular, preferable is the activated carbon of carbonaceous nature being resistant to oxidation by ozone, for example the one being produced using a coal raw material rather than a wooden raw material. Also employable is the activated carbon subjected to a special treatment for accelerating decomposition by ozone of ill-smelling components, for example, addition with a catalytic substance (e.g. iron and the like), or the activated carbon subjected to a special treatment for suppressing the decomposition capability for ozone (e.g. treatment with boric acid).

The method according to the present invention offers the advantages: (1) permitting a more efficient decomposition of ozone, as compared with the conventional methods, (2) retaining the characteristic, high capability of the activated carbon compositions having the manganese compounds and alkali metal and/or alkaline earth metal compounds supported, as being not affected directly by adsorbed oxidation products of the ill-smelling components, and therefore reducing its application amount, (3) reducing the complexity of regenerating procedures due to the large adsorption capacity of the initially loaded activated carbon and the prolonged service life of the activated carbon compositions supported with the manganese compounds and alkali metal and/or alkaline earth metal compounds, (4) allowing the application amount to be reduced down to less than one half that of the conventional methods, even when activated carbon with a high adsorption capability is used in combination with the activated carbon compositions supported with the manganese compounds and alkali metal and/or alkaline earth metal compounds, enabling a size reduction of the equipment, cut-down of power costs, etc., and (5) permitting a simultaneous treatment of ill-smelling components and ozone. In addition, by the use of the method being described in the following, ozone in an ozone-containing gas can be removed and even when the concentration of ozone in a gas is high or the gas is accompanied by organic gases like odors, both ozone and the organic gases can be removed very effectively:

An ozone-containing gas is contacted with firstly (I) the compositions containing the manganese compounds (1), alkali metal and/or alkaline earth metal compounds (2), activated carbon and clay, and then (II) the activated carbon compositions supported with the manganese compounds (1) and the alkali metal and/or alkaline earth metal compounds (2).

By means of the procedure (I), ozone contained in an ozone-cotaining gas is reduced in concentration with safety and securely without failure. The thus lower-concentrated ozone-containing gas, by way of the procedure (II) comprising contacting with the activated carbon compositions supported with the manganese compounds (1) and alkali metal and/or alkaline earth metal compounds (2), is gotten completely free of ozone.

BEST MODE FOR CARRYING OUT THE INVENTION

Example 1

Aqueous solution containing 3% by weight of manganese acetate and 1% by weight of magnesium chloride is sprayed over crushed activated carbon based on coconut shells having 1,050 m$^2$g in BET surface area and 9 to 14 mesh in grain size, which is then heat-treated under a stream of nitrogen of 200° C. for about 1 hour, thus producing the activated carbon containing 0.7 part by weight as Mn and 0.2 part by weight as Mg.

Using the thus produced activated carbon supported with manganese and magnesium, testing on the ozone decomposition activity is carried out under the below described conditions, along with the results being obtained as shown in Table 1:

Catalyst layer: 0.65 cm$\phi \times$4.5 cm (volume of 1.5 ml)
Reaction temperature: 25° C.
Total gas flow rate: 1.0 l/min.
Gas composition: air of 50% in relative humidity containing 80 ppm of ozone

Example 2

An aqueous solution containing 3% by weight of manganese nitrate and 1% by weight of potassium nitrate is sprayed over crushed activated carbon based on coconut shells having 1,050 m$^2$/g in BET surface area and 9 to 14 mesh in grain size, which is then heat-treated under a stream of nitrogen of 200° C. for about 1 hour, to produce activated carbon containing 0.7 part by weight as Mn and 0.2 part by weight as K. Using the thus produced activated carbon supported with manganese and potassium, testing on the ozone decomposition activity is conducted in the same manner as in Example 1, along with the results being obtained as shown in Table 1.

Example 3

Aqueous solution containing 3% by weight of manganese nitrate and 7% by weight of barium acetate is sprayed over crushed activated carbon based on coconut shells having 1,050 m$^2$/g in BET surface area and 9 to 14 mesh in grain size, which is then heat-treated under a stream of nitrogen of 200°°C. for about 1 hour, to produce the activated carbon containing 0.7 part by weight as Mn and 2.9 part by weight as Ba. Using the thus produced activated carbon supported with manganese and barium, testing on the ozone decomposition activity is carried out in the same manner as in Example 1, along with the results being obtained as shown in Table 1.

Reference Example 1

A 3% by weight aqueous solution of manganese nitrate is sprayed over crushed activated carbon based on coconut shells having 1,050 m$^2$/g in BET surface area and 9 to 14 mesh in grain size, which is then heat-treated under a stream of nitrogen of 200° C. for about 1 hour, to produce the activated carbon containing 1 part by weight as Mn. Using the thus produced activated carbon supported with active manganese oxide, testing on the ozone decomposition activity is effected in the same manner as in Example 1, along with the results being obtained as shown in Table 1.

Reference Example 2

Crushed activated carbon based on coconut shells having 1,050 m²/g in BET surface area and 9 to 14 mesh in grain size is dried under nitrogen atmosphere of 110° C. for about 1 hour, to carry out testing on the ozone decomposition activity in the same manner as in Example 1, along with the results being obtained as shown in Table 1.

TABLE 1

| | | Ozone decomposition rate, % Length of time elapsed | | | | |
|---|---|---|---|---|---|---|
| | | 10 hrs. | 20 hrs. | 30 hrs. | 40 hrs. | 100 hrs. |
| Example 1 | Activated carbon supported with 0.7 pt.* Mn and 0.2 pt. Mg. | 100 | 100 | 100 | 94 | 80 |
| Example 2 | Activated carbon supported with 0.7 pt. Mn and 0.2 pt. K. | 100 | 100 | 100 | 96 | 83 |
| Example 3 | Activated carbon supported with 0.7 pt. Mn and 2.9 pt. Ba | 100 | 100 | 100 | 91 | 77 |
| Ref. Ex. 1 | Activated carbon supported with 1.0 pt. Mn. | 100 | 100 | 80 | 70 | 29 |
| Ref. Ex. 2 | Activated carbon alone | 50 | 46 | 43 | 40 | 22.5 |

Remarks:
*; Pt. denotes the parts on a weight basis.

Example 4

Following the conventional process for producing activated carbon from coal raw material, with manganese nitrate and calcium carbonate added to the raw material, produced is the activated carbon with 1,200 m²/g in BET surface area and 4 to 6 mesh in grain size containing 0.2 part by weight of Mn and 1.9 part by weight of Ca. The thus produced activated carbon supported with manganese and calcium is crushed to 8 to 16 mesh in grain size, to carry out testing on the ozone decomposition activity under the conditions described below, along with the results being obtained as shown in Table 2:

Catalyst layer: 0.65 cm$\phi$×9.0 cm (volume of 3.0 ml)
Reaction temperature: 25° C.
Total gas flow rate: 1.0 l/min.
Gas composition: air of 50% in relative humidity containing 40 ppm of ozone.

Example 5

Commercially available activated carbon based on coconut shells being designed for use in the purification of air and having 1,260 m²/g in BET surface area and 4 to 6 mesh in grain size is crushed to 8 to 16 mesh, and is immersed for about 10 hours into an aqueous solution containing 2% by weight of manganese nitrate and 1% by weight of sodium nitrate. Following separation from the solution, heat treatment is conducted under a nitrogen stream at the temperature of 150° C. for about 1 hour to produce the activated carbon containing 0.8 part by weight as Mn and 0.5 part by weight as Na. Using the thus produced activated carbon supported with manganese and natrium, testing on the ozone decomposition activity is carried out in the same manner as in Example 4, along with the results being obtained as shown in Table 2.

Reference Example 3

Commercially available activated carbon based on coconut shells being designed for use in the purification of air and having 1,260 m²/g in BET surface area and 4 to 6 mesh in grain size is crushed to 8 to 16 mesh, to thus carry out testing on the ozone decomposition activity in the same manner as in Example 4, along with the results being obtained as shown in Table 2.

Reference Example 4

An aqueous solution containing 5% by weight of potassium permanganate is sprayed over commercially available silica alumina having 225 m²/g in BET surface area and 2 mm in average particle size, which is then heat-treated under a nitrogen stream of 250° C. for about 1 hour to produce silica alumina supported with manganese and potassium containing 1.2 parts by weight as Mn and 0.7 part by weight as K. Using the silica alumina thus produced, testing on the ozone decomposition activity is carried out in the same manner as in Example 4, along with the results being obtained as shown in Table 2.

TABLE 2

| | | Ozone decomposition capabilities | | | |
|---|---|---|---|---|---|
| | | Ozone decomposition rate, % Length of time elapsed, hrs. | | | |
| | | 100 | 200 | 300 | 400 |
| Example 4 | Activated carbon supported with 0.2 pt.* Mn and 1.9 pt. Ca. | 100 | 100 | 100 | 92 |
| Example 5 | Activated carbon supported with 0.8 pt. Mn and 0.5 pt. Na | 100 | 100 | 100 | 100 |
| Ref. Ex. 3 | Activated carbon alone | 100 | 56 | 43 | 25 |
| Ref. Ex. 4 | Silica alumina supported with 1.2 pt. Mn and 0.7 pt. K. | 13 | 3 | 0 | — |

Remarks:
*Pt. denotes the parts on a weight basis.

It is evident from the above Table that the activated carbon according to Example 4 and 5 has a high degree of the decomposition capability of ozone contained in an ozone-containing gas and has a prolonged service life.

Example 6

The first activated carbon layer consisted of packing 30 ml of cyclindrical-formed activated carbon based on coal with 1,700 m²/g in specific surface area and 4 to 6 mesh in grain size, and the second activated carbon layer packed with 6 ml of crushed activated carbon based on coconut shells with 1,060 m²/g in specific surface area and 4 to 8 mesh in grain size supported with 0.2 part by weight as Mn and 1.9 part by weight as Ca are connected in series, and air of 60% in relative humidity containing 10 ppm of hydrogen sulfide gas and 40 ppm of ozone is passed through two of these activated carbon layers, successively, at ambient temperature to conduct a test for removing hydrogen sulfide and decomposing ozone. Shown in FIG. 1 are a relationship of removal rate of hydrogen sulfide versus time observed in the first activated carbon layer and that of a concentration of ozone exhausted in the effluent gas versus time in the second layer. When hydrogen sulfide is detected in the effluent gas from the first activated layer at the outlet, flowing of the gas is temporarily suspended to wash the activated carbon in the layer with water. Analytical study of the recovered solution indicates that hydrogen sulfide in the gas is retained in the activated carbon as sulfuric acid. The activated carbon washed with water is well dried and packed in the first layer to pass the gas again, whereby there is no change in the capability for removal of hydrogen sulfide, with no deterioration observed in the ozone decomposition capability of the second layer as being confirmed on the effluent gas from the second layer. The activated carbon supported with 0.2 part by weight as Mn and 1.9 part by weight as Ca is produced in the conventional process for producing activated carbon, with manganese nitrate and calcium carbonate being added to raw materials.

Example 7

In the same manner as in Example 6, except for the use as a sample gas of air with 60% in relative humidity containing 10 ppm of methyl sulfide and 40 ppm of ozone, the gas flowing experiment is effected to test the removal of methyl sulfide and decomposition of ozone. Illustrated in FIG. 2 are progresses in relation to time of removal rate of methyl sulfide in the first layer and leakage of ozone from the second layer.

Example 8

An aqueous solution containing 3% by weight of manganese acetate and 1% by weight of magnesium chloride is sprayed over crushed activated carbon based on coconut shells with 1,050 m$^2$/g in BET surface area and 9 to 14 mesh in grain size which is then dried for about 1 hour in an electric dryer at 110° C. to produce the activated carbon containing 0.7 part by weight as Mn and 0.2 part by weight as Mg. Using the activated carbon supported with manganese and magnesium, testing on the ozone decomposition activity is carried out under the following conditions, with the results being obtained as shown in Table 3:

Catalysts layer: 0.65 cm$\phi$ × 4.5 cm (volume of 1.5 ml)
Reaction temperature: 25° C.
Total gas flow rate: 1.0 l/min.
Gas composition: air of 50% in relative humidity containing 80 ppm of ozone.

Example 9

An aqueous solution containing 3% by weight of manganese nitrate and 1% by weight of potassium nitrate is sprayed over crushed activated carbon based on coconut shells with 1,050 m$^2$/g in BET surface area and 9 to 14 mesh in grain size, which is then dried for about 1 hour in an electric dryer at 110° C. to produce the activated carbon containing 0.7 part by weight as Mn and 0.2 part by weight as K. Using the thus produced activated carbon supported with manganese and potassium, testing on the ozone decomposition activity is carried out in the same manner as in Example 8, with the results being obtained as shown in Table 3.

Example 10

An aqueous solution containing 3% by weight of manganese nitrate and 7% by weight of barium acetate is sprayed over crushed activated carbon based on coconut shells with 1,050 m$^2$/g and 9 to 14 mesh in grain size, which is then dried for about 1 hour in an electric dryer at 110° C. to produce the activated carbon containing 0.7 part by weight as Mn and 2.9 part by weight as Ba. Using the thus produced activated carbon supported with manganese and barium, testing on the ozone decomposition activity is effected in the same manner as in Example 8, along with the results being obtained as shown in Table 3.

Reference Example 5

A 3% by weight aqueous solution of manganese nitrate is sprayed over crushed activated carbon based on coconut shells with 1,050 m$^2$/g in BET surface area and 9 to 14 mesh in grain size, which is then dried in an electric dryer at 110° C. for about 1 hour to produce the activated carbon containing 1 part by weight as Mn. Using the thus produced activated carbon supported with manganese nitrate, testing on the ozone decomposition activity is effected in the same manner as in Example 8, along with the results being obtained as shown in Table 3.

Reference Example 6

Crushed activated carbon based on coconut shells with 1,050 m$^2$/g in BET surface area and 9 to 14 mesh in grain size is dried for about 1 hour under a nitrogen atmosphere of 110° C. and testing on the ozone decomposition activity is effected with the activated carbon in the same manner as in Example 8, along with the results being obtained as shown in Table 3.

TABLE 3

| | Ozone decomposition capability: | | | | | |
| --- | --- | --- | --- | --- | --- | --- |
| | | Ozone decomposition rate, % Length of time elapsed, hrs. | | | | |
| | | 10 | 20 | 30 | 40 | 100 |
| Example 8 | Activated carbon supported with 0.7 pt.* Mn and 0.2 pt. Mg | 100 | 100 | 97 | 85 | 78 |
| Example 9 | Activated carbon supported with 0.7 pt. Mn and 0.2 pt. K | 100 | 100 | 100 | 93 | 81 |
| Example 10 | Activated carbon supported with 0.7 pt. Mn and 2.9 pt. Ba | 100 | 100 | 100 | 83 | 75 |
| Ref. Ex. 5 | Activated carbon supported with 1.0 pt. Mn | 100 | 98 | 77 | 67 | 29 |
| Ref. Ex. 6 | Activated carbon alone | 50 | 46 | 43 | 40 | 22.5 |

Remarks:
*; Pt. denotes the parts on a weight basis.

Example 11

On a dry weight basis, 25 g of "Kanuma Clay" (refined by elutriation), 7.6 g of Kibushi clay, 7.6 g of bentonite, 2.5 g of gypsum, and a mixture of 10 g of coconut-shell based activated carbon with 1,025 m$^2$/g in BET surface area finely crushed to less than 300 mesh and 2.5 g of manganese nitrate are added with 35 g of water, followed by mixing well and moulding by extrusion to a cylindrical form of 3 mm$\phi$. The mouldings are preliminarily dried at 100° to 120° C., and heat-treated under a nitrogen stream at 300° C. for ½ hour to produce the composition A for removing ozone.

Example 12

Using 25 g of Kanuma clay (not refined by elutriation), 8.0 g of Kibushi clay, 7.2 g of bentonite, 2 g of potassium sulfate and 10.5 g of the activated carbon of the similar physical properties as in Example 11 supported with 5 wt.% manganese acetate, the composition B for removing ozone are produced in the same manner as in Example 11 (treatment temperature of 350° C.).

Reference Example 7

Using 80 g of Kanuma clay (refined by elutriation) and 20 g of the activated carbon of the same type as in Example 11, the composition C for removing ozone are produced in the same manner as in Example 11 (treatment temperature of 500° C.).

Reference Example 8

Using 60 g of Kanuma clay (refined by elutriation), 20 g of kaolin and 20 g of the activated carbon of the same type as in Example 11, the composition D for removing ozone are produced in the same manner as in Example 11 (treatment temperature of 500° C.).

Reference Example 9

The compositions for removing ozone based on activated carbon and allophane (commercially available product) are crushed to sift out the crushed particles of 10 to 20 mesh in grain size.

With the compositions for removing ozone, A through D, and the commercially available product, the following tests are effected regarding the ozone-removing capability, mechanical strength and thermal stability of the particles:

(1) Test on the ozone-removing capability

Each of the ozone removing agents is crushed, followed by sifting out the crushed particles of 10 to 20 mesh in grain size to pack in a glass-made reaction column with the packed layer measuring 0.65 cm $\phi \times 9.0$ cm (volume of 3.0 ml). The air with relative humidity of 65% containing 40 ppm of ozone is contacted with it at the reaction temperature of 25° C. and at the total gas flow rate of 500 ml/min. to follow, in relation to time by the KI method, concentrations of ozone leakages in the effluent gas from the packed layer.

(2) Test on mechanical strength 15 g of each of the ozone removing agents is sifted by a 8-mesh sieve for 5 min. in accordance with the testing method on the grain size as specified in JIS-K1474 ('75), and 10 g of the specimen remained on the sieve, together with 10 pieces of steel balls with 5/16 inch of diameter, is placed in a stainless cylinder with 25 mm in inner diameter and 305 mm in length, which, after being covered, is allowed to turn vertically around its center as the axis at 25 rpm for 5 minutes to give impact to the specimen. The specimen, being separated from the steel balls, is sifted for 5 minutes by a 9-mesh sieve in accordance with the testing method on the grain size as specified in JIS-K1474 ('75) and, the specimen remained on the sieve is weighed to calculate mechanical strength H (%) of the particles by the following equation:

$$H = (W/S) \times 100$$

where: $S$ = weight of a specimen (10 g); $W$ = weight of the specimen remained on the sieve (g).

(3) Test on the thermal stability

Using about 13.5 ml of the dried specimen prepared from each of the ozone-removing agents and in accordance with the method as specified in JIS-K1474 ('75), ignition temperature is determined based on a sharp increase in temperature of the specimen when it is heated under a stream of air at a constant heating rate.

Results of the above-mentioned tests are shown in Table 4:

TABLE 4

| Compositions | | Ozone-removing capability | Mechanical strength of particles | Ignition temperature |
| --- | --- | --- | --- | --- |
| A | Example | 174 hrs. | 94% | 450° C. |
| B | Example | 169 hrs. | 97% | 448° C. |
| C | Ref. Example | 45 hrs. | 20% | >470° C. |
| D | Ref. Example | 48 hrs. | 41% | >470° C. |
| Commercial product | Ref. Example | 48 hrs. | 77% | >470° C. |

Example 13

On a dry weight basis, a mixture of 250 g of Kanuma Clay (refined by elutriation), 760 g of Kibushi clay, 760 g of bentonite, 25 g of gypsum, 200 g of coconut-shell based activated carbon with 1,025 m²/g in BET surface area being crushed to less than 300 mesh, 20 g of manganese nitrate and 25 g of sodium nitrate is added with 375 g of water, being mixed well, and is moulded by extrusion to a cylindrical form of 4 mm$\phi$. The mouldings are preliminarily dried at a temperature of 100° to 120° C., and are heat-treated under a stream of nitrogen of 500° C. for about ½ hour to produce the compositions for removing ozone.

The thus produced compositions for removing ozone and the activated carbon, and the activated carbon supported with manganese and potassium are packed in that order, i.e. firstly (1) the compositions for removing ozone and then (2) the activated carbon supported with manganese and potassium, to determine the ozone-removing capability under the conditions below described and the thermal stability in accordance with the JIS method, with the results being obtained as shown in Tables 5 and 6:

Testing conditions:
  Gas composition; air with 85% in relative humidity containing 800 ppm of ozone.
  Space velocity; 40,000 H$^{-1}$, compositions for removing ozone; 80,000 H$^{-1}$, activated carbon supported with manganese compounds, alkali metal, alkaline earth metal compounds.
  Contacting temperature; 30° C.

Reference Example 10

Commercially available, coconut-shell based activated carbon with 1,046 m²/g in BET surface area and 4 to 8 mesh in grain size is crushed, sifted to a uniform grain size of 9 to 14 mesh, and determined for the ozone-removing capability in accordance with the testing conditions as described in Example 11 (space velocity; 20,000 H$^{-1}$). The result is shown in Table 5. Also shown in Table 5 is the ignition temperature determined.

TABLE 5

| | Ozone removing rate (%) | | | | | |
|---|---|---|---|---|---|---|
| | 10 hrs. | 20 hrs. | 30 hrs. | 40 hrs. | 50 hrs. | 100 hrs. |
| Example 13 | 100 | 100 | 100 | 100 | 100 | 100 |
| Ref. Example 10 | 100 | 95 | 83 | 66 | 53 | — |

TABLE 6

| | Ignition temp. (°C.) |
|---|---|
| Example 13 | >420 |
| Ref. Example 10 | 290 |

INDUSTRIAL APPLICABILITY

The compositions according to the present invention are utilizable for removing ozone discharged in the purification and sterilization of service water, treatment of industrial waste water, treatment of sewages, denitration of waste gases, and removal of different kinds of offensive odors, etc. as well as for removing ozone inside airplanes flying in the ozonosphere and the like.

Figure 1:
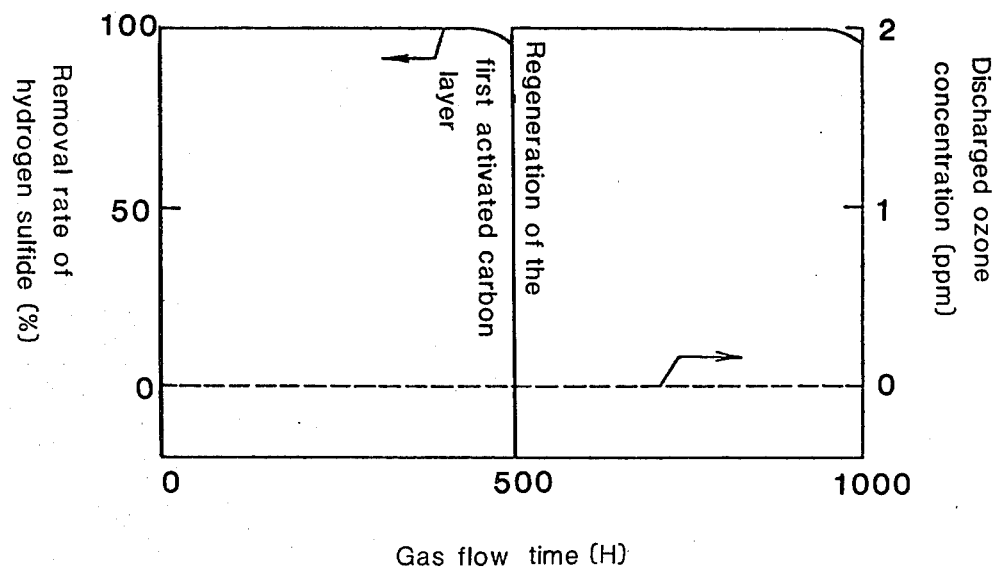
FIGS. 1 and 2 illustrate the test results obtained in Examples 6 and 7, with the gas flowing time (H) plotted as abscissa and the discharged ozone concentration and removal rate of hydrogen sulfide or methyl sulfide as ordinate.
Figure 2:
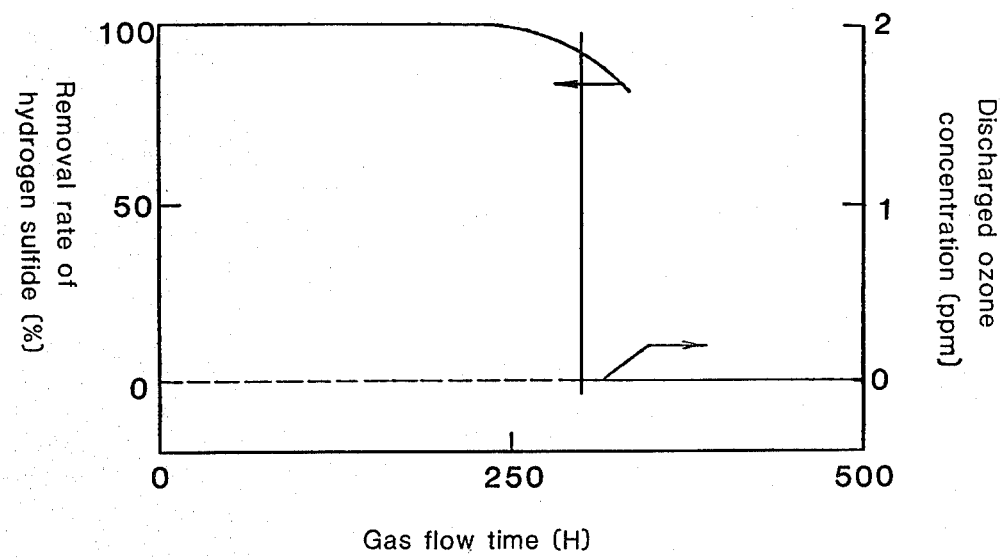

We claim:

1. A method for removing ozone from an ozone-containing gas which comprises contacting an ozone-containing gas with an activated carbon composition supported with (1) about 0.1 to 10 parts by weight as Mn based on 100 parts by weight of activated carbon of a manganese nitrate and (2) about 0.1 to 10 parts by weight as a metal element based on 100 parts by weight of activated carbon of sodium nitrate, potassium nitrate or a mixture thereof.

2. A method for removing ozone according to claim 1, wherein the activated carbon compositions supported with (1) manganese nitrate and (2) sodium or potassium nitrate are ones which have never been subjected to burning.

3. A method for removing ozone according to claim 1, wherein the activated carbon compositions supported with (1) manganese nitrate and (2) sodium or potassium nitrate are ones which have been subjected to burning.

4. A method for removing ozone according to claim 1, wherein the ozone-containing gas is treated with an activated carbon having a high absorption capability prior to contacting said gas with the activated carbon compositions supported with (1) manganese nitrate and (2) sodium or potassium nitrate.

5. A method for removing ozone according to claim 1, wherein the activated carbon compositions further contain clay.

6. A method for removing ozone according to claim 1, wherein the ozone-containing gas is treated with an activated carbon composition as defined in claim 11 and further containing clay, prior to contacting with an activated carbon composition supported with (1) manganese nitrate and (2) sodium or potassium nitrate.

* * * * *